USO10414521B1

United States Patent
Hardy et al.

(10) Patent No.: US 10,414,521 B1
(45) Date of Patent: Sep. 17, 2019

(54) NUCLEAR ROCKET ENGINE WITH PEBBLE FUEL SOURCE

(71) Applicant: HARDY ENGINEERING & MANUFACTURING, INC., Auburn, WA (US)

(72) Inventors: Richard Hardy, Normandy Park, WA (US); Jonathan Hardy, Normandy Park, WA (US); Anna E Hardy, Normandy Park, WA (US)

(73) Assignee: HARDY ENGINEERING & MANUFACTURING, INC., Auburn, WA (US)

( * ) Notice: Subject to any disclaimer, the term of this patent is extended or adjusted under 35 U.S.C. 154(b) by 0 days.

(21) Appl. No.: 16/238,329

(22) Filed: Jan. 2, 2019

Related U.S. Application Data (63) Continuation-in-part of application No. 15/955,596, filed on Apr. 17, 2018.

(51) Int. Cl.
*B64G 1/40* (2006.01)
*F02K 9/40* (2006.01)
(Continued)

(52) U.S. Cl.
CPC ............... *B64G 1/408* (2013.01); *F02K 9/40* (2013.01); *F02K 9/42* (2013.01); *F02K 9/52* (2013.01); *F02K 9/64* (2013.01)

(58) Field of Classification Search
CPC . B64G 1/408; F03H 99/00; F02K 9/40; F02K 9/64; F02K 9/42; F02K 9/52
See application file for complete search history.

(56) References Cited

U.S. PATENT DOCUMENTS 3,202,582 A   8/1965   Rom
3,203,173 A   8/1965   Madey
(Continued)

FOREIGN PATENT DOCUMENTS

CN   201206510 Y   3/2009
FR   2250898       6/1975
(Continued)

OTHER PUBLICATIONS

Robert W. Bussard. Concepts for Future Nuclear Rocket Propulsion, Jet Propulsion, Apr. 1958. (8 pages).
(Continued)

*Primary Examiner* — Gerald L Sung
*Assistant Examiner* — William L Breazeal
(74) *Attorney, Agent, or Firm* — R. Reams Goodloe, Jr.

(57) ABSTRACT

A nuclear thermal propulsion rocket engine. A source of fissionable material is provided in a bed of fuel pebbles located in a reactor. A fluid having neutron moderating constituents, such as hydrogen and/or carbon, therein, is provided, which may be in the form of methane, or ethane, or a combination thereof, or may further include various isotopes of hydrogen. An external neutron source is provided using a neutron beam generator. Reactor design geometry provides containment of fissionable material, and for any byproducts of fission reactions, in the reactor during acceleration of the rocket. Impact of neutrons on fissionable material results in a nuclear fission reaction conditions in the reactor, resulting in release of heat energy to fluids provided to the reactor. The reactor is sized and shaped to contain fuel pebbles containing fissionable material, and to confine expandable fluids as they remove heat from fuel pebbles. the heated fluids are discharged out through a throat, into a rocket engine expansion nozzle for propulsive discharge, The design provides a rocket engine with a specific impulse (Continued)

in the range of from about eight hundred (800) seconds to about twenty five hundred (2500) seconds.

20 Claims, 7 Drawing Sheets

(51) Int. Cl.
*F02K 9/52* (2006.01)
*F02K 9/64* (2006.01)
*F02K 9/42* (2006.01)

(56) References Cited

U.S. PATENT DOCUMENTS

| | | | |
|---|---|---|---|
| 3,270,496 | A | 9/1966 | Rom |
| 3,307,357 | A * | 3/1967 | Colgate ............... G21D 5/02 |
| | | | 376/318 |
| 3,315,471 | A | 4/1967 | Dailey et al. |
| 3,374,148 | A | 3/1968 | Rom |
| 3,383,858 | A | 5/1968 | Willinski et al. |
| 3,399,534 | A | 9/1968 | Hunter et al. |
| 3,546,069 | A | 12/1970 | McLafferty |
| 3,574,057 | A | 4/1971 | Rom |
| 3,711,370 | A | 1/1973 | Von Ohain et al. |
| 3,713,970 | A | 1/1973 | Von Ohain et al. |
| 3,714,782 | A | 2/1973 | Weinbaum et al. |
| 3,715,110 | A | 2/1973 | Jensen et al. |
| 3,768,253 | A * | 10/1973 | Drawbaugh ............ G21C 1/22 |
| | | | 376/319 |
| 4,036,012 | A | 7/1977 | Monsler |
| 4,085,582 | A | 4/1978 | Hausfeld |
| 4,121,971 | A | 10/1978 | Marwick |
| 4,269,659 | A | 5/1981 | Goldberg |
| 4,401,618 | A | 8/1983 | Salisbury |
| 4,426,843 | A | 1/1984 | Fowler et al. |
| 4,666,678 | A | 5/1987 | Lemelson |
| 4,802,639 | A | 2/1989 | Hardy et al. |
| 5,067,316 | A | 11/1991 | Bonniot |
| H1501 | H | 11/1995 | Leyse |
| 5,475,722 | A | 12/1995 | Culver |
| 5,636,512 | A | 6/1997 | Culver |
| 5,774,514 | A | 6/1998 | Rubbia |
| 5,873,239 | A | 2/1999 | Culver |
| 6,367,243 | B1 | 4/2002 | Schmidt |
| 6,789,316 | B2 | 9/2004 | Haggander et al. |
| 6,876,714 | B2 | 4/2005 | Rubbia |
| 7,389,636 | B2 | 6/2008 | Fowler et al. |
| 7,506,500 | B1 | 3/2009 | Krishan |
| 9,180,985 | B1 | 11/2015 | Hardy et al. |
| 9,346,565 | B1 | 5/2016 | Hardy et al. |
| 2002/0080907 | A1 | 6/2002 | Rubbia |
| 2006/0126771 | A1 | 6/2006 | Da Conceicao |
| 2007/0127617 | A1 | 6/2007 | Sutherland |
| 2007/0133733 | A1 | 6/2007 | Popa-Simil |
| 2008/0232533 | A1 | 9/2008 | Blanovsky |
| 2009/0000268 | A1 | 1/2009 | Yurash |
| 2009/0175402 | A1 | 7/2009 | Hyde et al. |
| 2015/0098544 | A1 | 4/2015 | Blanovsky |

FOREIGN PATENT DOCUMENTS

| | | |
|---|---|---|
| JP | 201610965 A | 6/2016 |
| RU | 2151324 C1 | 6/2000 |
| WO | WO2008-128422 A1 | 10/2008 |

OTHER PUBLICATIONS

Frank E. Rom, Advances Reactor Concepts for Nuclear Propulsion, Astronautics, vol. 4, No. 10, Oct. 1959 (pp. 20-22,46-50). Appeared as reprint in Propulsion Techniques, Action and Reaction, Peter J. Turchi, AIAA, 1998. (5 pages).

Franklin P. Durham, Solid-Core Nuclear Rocket Design, Astronautics, vol. 4, No. 10, Oct. 1050, (pp. 26,7,102-104). Appeared as reprint in Propulsion Techniques, Action and Reaction, Peter J. Turchi, AIAA, 1998. (4 pages).
Jerry Grey, Gaseous-Core Nuclear Rockets, Astronautics, vol. 4, No. 10, Oct. 1959. (pp. 23-25, 110-112). Appeared as reprint in Propulsion Techniques, Action and Reaction, Peter J. Turchi, AIAA, 1998. (5 pages).
Robert W. Bussard, Boundary Conditions for Nuclear Propulsion, Astronautics, vol. 4, No. 10, Oct. 1959. (pp. 28, 29, 119-122). Appeared as reprint in Propulsion Techniques, Action and Reaction, Peter J. Turchi, AIAA, 1998. (6 pages).
Robert W. Bussard, Nuclear Rocketry—The First Bright Hopes, Astronautics, vol. 7, No. 12, Dec. 1962. (pp. 32-35). Appeared as reprint in Propulsion Techniques, Action and Reaction, Peter J. Turchi, AIAA, 1998. (4 pages).
Ralph S. Cooper, Prospects for Advances High-Thrust Nuclear Propulsion, Astronautics and Aeronautics, vol. 4, No. 1, Jan. 1966. (pp. 54-59). Appeared as reprint in Propulsion Techniques, Action and Reaction, Peter J. Turchi, AIAA, 1998. (6 pages).
Jerry Grey, Where The Carrot Does Not Improve Vision—Nuclear Energy for Space, Astronautics and Aeronautics, vol. 4, No. 3, Mar. 1966. (pp. 68-72). Appeared as reprint in Propulsion Techniques, Action and Reaction, Peter J. Turchi, AIAA, 1998. (4 pages).
R. W. Schroeder, Nerva—Entering a New Phase, Astronautics and Aeronautics, vol. 6, No. 5, May 1968. (pp. 42-53). Appeared as reprint in Propulsion Techniques, Action and Reaction. Peter J. Turchi, AIAA, 1998. (8 pages).
Robert G. Ragsdale and Edward A. Willis, Jr.,—Gas-Core Rocket Reactors—A New Look. NASA Technical Memorandum. N71-23907 (nasa tm X 67823). Technical Paper proposed for presentation at Seventh Propulsion Joint Specialist Conference sponsored by the American Institute of Aeronautics and Astronautics, Salt Lake City, Utah, Jun. 14-18, 1971. (18 pages).
Laurence H. Fishbach, Edward A. Willis. Performance Potential of Gas-Core and Fusion Rockets: A Mission Applications Survey. NASA Technical Memorandum. N71-37069 (NASA TM X-67940). Second Symposium on Uranium Plasmas: Research and Applications sponsored by the American Institute of Aeronautics and Astronautics. Atlanta, Georgia. Nov. 15, 1971. (18 pages).
Frank E. Rom, Russell C. Drew, What'sHolding Nuclear Propulsion Back? Astronautics and Aeronautics, vol. 10, No. 1, Jan. 1972. (pp. 62-64). Appeared as reprint in Propulsion Techniques, Action and Reaction, Peter J. Tuchi, AIAA, 1998. (4 pages).
Charles L. Whitemarsh, Jr. Neutronics Analysis of an Open-Cycle High-Impulse Gas-Core Reactor Concept, Report No. E-6390. (NASA TM X 2534). 1972-04-00. (37 pages).
Stanley K. Borowski, Nuclear Propulsion—A Vital Technology for the Exploration of Mars and the Planets Beyond. Report No. E-4369 (NASA TM-101354). Jul. 18, 1987. (50 pages).
Gary L. Bennett, NASA Program Manager, Propulstion, Power and Energy Division, Office of Aeronautics, Exploration and Technology, NASA Headquarters, Washington, C.D. Paper—Nuclear Thermal Propulsion Program Overview (1990)(31 pages).
R. Zubrin. Nuclear Salt Water Rockets: High Thrust at 10,000 SEC ISP. Journal of the British Interplanetary Society. vol. 44. pp. 371-371. 1991-00-00. (6 pages).
Stanley K. Borowski and John S. Clark, Nuclear Thermal Rockets: Key to Moon-Mars Exploration, Aerospace America, vol. 30, No. 7, Jul. 1992. (pp. 34-37,48). Appeared as reprint in Propulsion Techniques, Action and Reaction, Peter J. Turchi, AIAA, 1998. (3 pages).
John S. Clark, U.S./CIS Eye Joint Nuclear Rocket Venture, Aerospace America, vol. 31, No, 7, Jul. 1993. (pp. 28-30,35). Appeared as reprint in Propulsion Techniques, Action and Reaction, Peter J. Turchi, AIAA, 1998. (3 pages).
Anthony C. Muscatello and Michael G. Houts. Surplus Weapons-Grade Plutonium—A Resource for Exploring and Terraforming Mars. The Case for Mars VI. University of Colorado, Boulder, Colorado, Jul. 17-20, 1996. (9 pages).
A.S. Cherkasov. Modern Problems of Nuclear Energetics. Kharkov National University, Ukraine. Sep. 25, 2001. (4 pages).
Timothy Lawrence. Nuclear Thermal Rocket Propulsion Systems, IAA White Paper. Department of Astronautics. Jan. 12, 2005. (18 pages).

(56) References Cited

OTHER PUBLICATIONS

Rodney E. Clark, Robert B. Sheldon. Dusty Plasma Based Fission Fragment Nuclear Reactor. Jul. 10, 2005. Grassmere Dynamics LLC, 41st AIAA/ASME/SAE/ASEE Joint Propulsion Conference & Exhibit, Jul. 10-13, 2005, Tucson. AZ. (7 pages).
Michael G. Hoots, PhD. Space Nuclear Power and Propulsion, Report M15-4138, Oct. 15, 2014. (29 pages) NASA Technical Reports Server (NTRS). http://ntrs.nasa.gov/search.jsp?N=0&Ntk=All&Ntx=mode+matchallany&Ntt=M15-4138 Date Acquired by NTRS: Jan. 14, 2015. (Access Date: Mar. 17, 2015).
McNutt, Dr. Ralph L. A Realistic Interstellar Explorer, The Johns Hopkins University. Phase I Final Report, NASA Institute for Advanced Concepts. NIAC CP 98-01. Date of Submission: May 31, 1999; Reporting Month: May 1999 (60 pages).
Palaszewski, Bryan. High Power Electric and Advanced Space: Propulsion: Making the Impossible Possible, Presented to the National Atomic Museum, Albuquerque, NM. NASA Glenn Research Center. Lewis Field, Feb. 19, 2005 (54 pages).
Ross, Shane, "Nuclear Thermal Rockets: The Physics of the Fission Reactor", Control and Dynamical Systems, Caltec, Pasadena, CA, Mar. 16, 2001 (9 pages).
Neutron Generator, Wikipedia. (Aug. 24, 2015) https://en.wikipedia.org/wiki/Neutron_generator (7 pages).
http://en.wikipedia.org/wiki/Nuclear_thermal_rocket. Nuclear thermal rocket. From: Wikipedia, the free encyclopedia. (Access Date: Apr. 20, 2015) (12 pages).
RD-0410 http://www.astronautix.com/engines/rd0410.htm#more (Access Date: Mar. 17, 2015) (3 pages) (3 pages).
Nuclear/LH2 http://www.astronautix.com/props/nucarlh2.htm (Access Date: Mar. 17, 2015) (6 pages).
Thermal rocket—Wikipedia, the free encyclopedia. http://en.wikipedia.org/wiki/Thermal_rocket. (Access Date: Mar. 17, 2015) (3 pages).
Cassenti, Brice, "Nuclear Thermal Rockets", University of Connecticut—Date Unknown (25 pgs).
Nuclear Thermal Propulsion, A Joint NASA/DOE/DOD Workshop, NASA Conference Publication 10079, held at Holiday Inn Strongsville, Sponsored by NASA Lewis Research Center, Cleveland, Ohio—Jul. 10-12, 1990. (515 pages).
Office of the Inspector General, Audit Report. The Timber Wind Special Access Program, Report No. 93-033—Dec. 16, 1992 (75 pages).
Haslett, R.A., Space Nuclear Thermal Propulsion Program Final Report. Grumman Aerospace Corporation, Bethpage NY. PL-TR-95/1064, May 1995, Final Report (142 pages).
Safety Reports Series, No. 9, Safe Handling and Storage of Plutonium. International Atomic Energy Agency, Vienna, 1998, VICL 98-00198, ISBN 92-0-102998-5 (147 pages).
Parker, James Roger (Iowa State University), Banks, C.V. (Iowa State University), Some bis(dialkylphosphinyl) Methanes as Solvent Extractants. Iowa State Universoty Digital Repository, Ames Laboratory Technical Reports. Jun. 1964 (194 pages).
Hibbard, Robert R. and Evans, Jr., Albert.—Lewis Research Center, Cleveland, Ohio. NASA Technical Note, NASA TN D-4701. On The Solubilities and Rates of Solution of Gases in Liquid Methane. National Aeronautics and Space Administration, Washington, D.C. Aug. 1968 (25 pages).
Douglas, Howard W.—Lewis Research Center, Cleveland, Ohio 44135. , Schmidt, Harold W., Dr. Van Huff, N.E., et al., NASA Space Vehicle Design Criteria (Chemical Propulsion) Liquid Rocket Engine Fluid-Cooled Combustion Chambers. National Aeronautics and Space Administration Apr. 1972 (130 pages).
Houts, Phd, Michael G. NASA Marshall Space Flight Center, Huntsville, Alabama. Publication entitled: Space Nuclear Power and Propulsion. Publication date: Oct. 16, 2014. Angelo State University Physics Colloquium, San Angelo, New Mexican. http://ntrs.nasa.gov/search.jsp?R=20140016814.
Gao, Yang, Zheng[1], Wei-Fangl[2], et al. Nuclear Science and Techniques 26,S10303 (2015) Gamma and Alpha Radiolysis of TBP Solvent. (1) Fundamental Science on Nuclear Safety and Simulation Technology Lab. Harbin Engineering University, Harbin 150001, China. (2) Department of Radiochemistry, China Institute of Atomic Energy, beiging, 102403, China. accepted in revised form Jul. 19, 2014; published online Dec. 20, 2014. (6 pages).
Shah, Kamal; Browing, Eric; Saxena, Prabal, I H I E & C. Tackling the Issues with Pipeline Gas Contaminants for LNG Export Facilities. Canada LNG Export Conference & Exhibition. May 11, 2016 (11 pages).
Bissell, W.R. and Gunn, S.V., AIAA-92/3859—Turbopump Options for Nuclear Thermal Rockets. AIAA/SAE/ASME/ASEE 28th Joint Propulsion Conference and Exhibit, Jul. 6-8, 1992, Nashville, TN (14 pages).

\* cited by examiner

NUCLEAR ROCKET ENGINE WITH PEBBLE FUEL SOURCE

RELATED PATENT APPLICATIONS

This application is a Continuation-In-Part of pending U.S. patent application Ser. No. 15/955,596, filed on Apr. 17, 2018 entitled NUCLEAR THERMAL PROPULSION ROCKET ENGINE, the disclosure of which is incorporated herein in its entirety, including its specification, drawing, and claims, by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to rocket engines, and more specifically, to rocket engines which utilize nuclear fission as the source for thermal energy in the creation of motive force to create specific impulse sufficient for lifting objects to earth orbit, or for high velocity insertion into interplanetary flight.

BACKGROUND

A continuing interest exists for improvements in rocket engines, and more particularly for designs that would provide a significant increase in efficiency, as often characterized by the benchmark of specific impulse, especially as might be compared to conventional chemically fueled rocket engines. Such new rocket engines might be useful in a variety of applications. Launch operational costs might be substantially reduced on a per pound of payload basis, by adoption of a new nuclear thermal propulsion rocket engine design that provides significant improvements in the specific impulse, as compared to existing prior art rocket engine designs. Further, from the point of view of overall mission costs, since the mass of most components of rocket vehicles are proportional to the mass of the propellant, it would be desirable to develop a new rocket engine design that reduces the mass of consumable components necessary for initiating lift off and acceleration, whether to orbital velocity, or for achieving interplanetary velocities which would considerably shorten proposed time frames for missions to the planet Mars. Such an improvement would have a major impact on the entire field of rocket science from a launch weight to payload ratio basis. For missions beyond earth orbit it would be advantageous, from the point of view of mission duration, to provide a new rocket engine design that reduces not only the payload to launch weight, but also the transit time to the mission objective. Such improvements could be achieved by providing high specific impulse, so as to minimize fuel required to achieve high vehicle velocities necessary to accomplish a selected interplanetary mission in a minimal time frame, as compared to use of chemical based fuel systems. And, it would be desirable to provide such an improved rocket engine that includes components which have been reused and identified as comparatively reliable and cost effective, and thus, minimizes design risk and thus minimizes the extent of testing that may be necessary, as compared to many alternate designs which are subject to stress and strain from temperature and pressure in rocket engine service. Thus, it can be appreciated that it would be advantageous to provide a new, high efficiency rocket engine design which provides a high specific impulse, thus minimizing the launch weight to payload ratio.

In general, the efficiency of a rocket engine may be evaluated by the effective use of the consumable propellant, i.e. the amount of impulse produced per mass unit of propellant, which is itself proportional to the velocity of the gases leaving the rocket engine nozzle. In nuclear thermal rocket engine systems, the specific impulse increases as the square root of the temperature, and inversely as the square root of the molecular mass of the gases leaving the rocket engine nozzle. Consequently, in the design of a nuclear thermal rocket engine, efficiency is maximized by using the highest temperature available, given materials design constraints, and by utilizing a propulsive fluid that has a very low molecular mass for generation of thrust.

A variety of fission based rocket engines have been contemplated, and some have been tested. An overview of the current status of such efforts, and suggestions as to suitable configurations for various missions, was published on Oct. 16, 2014, at the Angelo State University Physics Colloquium in San Angelo, N. Mex., by Michael G. Houts, Ph.D, of the NASA Marshall Space Flight Center, Huntsville, Ala., in his presentation entitled Space Nuclear Power and Propulsion; a copy of which is available at: http://ntrs.nasa.gov/search.jsp?R=20140016914. As he notes, the Rover/NERVA program (Ser. No. 19/554,973) tested a fission rocket engine design. Further, the most powerful nuclear rocket engine that has been tested, to date, was the Phoebus 2a, which utilized a reactor that was operated at a power level of more than 4.0 million kilowatts, during 12 minutes of a 32 minute test firing. However, it is clear that the various nuclear fission rocket engine designs currently available have various drawbacks, such as excessive gamma radiation production of retained core components, which requires extensive and heavy shielding, if used on manned missions.

One of the more interesting disclosures of a fission based rocket engine was provided in U.S. Pat. No. 6,876,714 B2, issued on Apr. 5, 2005 to Carlo Rubbia, which is titled DEVICE FOR HEATING GAS FROM A THIN LAYER OF NUCLEAR FUEL, AND SPACE ENGINE INCORPORATING SUCH DEVICE, the disclosure of which is incorporated herein in its entirety by this reference. That patent discloses the heating of hydrogen gas by fission fragments emitted from a thin film of fissile material, such as Americium metal or a compound thereof, which is deposited on an inner wall of a cooled chamber. However, that device generally describes the use of fissile material in critical mass conditions, and although it mentions the contemplation of sub-critical mass fission arrangements, details of such a condition are scant, if indeed present at all in the description thereof.

Additionally, an improved design for a nuclear thermal propulsion rocket engine was provided in U.S. Pat. No. 9,180,985 B1, issued on Nov. 10, 2015, to Hardy et al., which is titled NUCLEAR THERMAL PROPULSION ROCKET ENGINE, the disclosure of which is incorporated herein in its entirety by this reference.

Subsequent work has revealed that it would be desirable to configure a reactor in which fission occurs in a manner which minimizes or substantially prevents the loss of fissile materials. It would be desirable to provide a design which minimizes loss of high mass constituents such as uranium and/or plutonium, particularly since ejecting such high molecular weight materials out of the rocket nozzle detracts from the amount specific impulse provided.

Thus, a technical problem remains, namely the need to provide an improved design for a high specific impulse nuclear thermal propulsion rocket engine that minimizes or prevents the loss of fissile materials during firing of the rocket engine. Moreover it would be advantageous if such a design simultaneously resolves two or more of the various practical problems, including (a) providing for power control, especially as related to power generation amounts at any given time, by providing for throttling of the fission reaction; (b) minimizing the weight of consumables (such as chemical fuel constituents for a mission) on a per payload pound basis; (c) avoiding excessive radiation shielding requirements when the design is used in manned missions, by avoiding use of retained radioactive hardware that generates large gamma ray emissions; (d) minimizing or preventing loss of fissile materials during firing of the rocket engine; and (e) providing a high specific impulse, as compared to chemical/combustion based rocket engines.

SUMMARY

A novel fission based nuclear thermal propulsion rocket engine has been developed, which, in various embodiments, simultaneously provides a high specific impulse propulsion system, enables the regulation of the power output by moderating the neutrons produced during fission, and which provides a reaction chamber configured with an outlet substantially toward the direction of travel of the rocket, rather than opposite the direction of travel of the rocket. Such orientation is advantageous in minimizing or preventing the loss of high molecular weight fissile materials from the rocket engine. In an embodiment, pebble fuel elements are utilized, which also aids in retention of high molecular weight fissile materials, as well as products produced from fission. Moreover, by physically containing such high molecular weight fissile materials in the reactor due to the force of acceleration of the rocket during firing, the loss of fissile material and byproducts of fission is minimized or substantially prevented, thereby avoiding loss of specific impulse of the rocket engine. The rocket engine design may utilize fuel pebbles including a source of fissionable material. Such fuel pebbles may include fissile elements (e.g. $^{233}U$, $^{235}U$, $^{231}Th$, $^{239}Pu$), breeder elements (e.g. $^{238}U$, $^{232}Th$), burnable poisons (e.g. B, Hf, etc.), and combinations of fuel elements, breeder elements, and burnable poisons. As an example, a uranium based fuel may include the fissile isotope $^{235}U$ and breeder isotope $^{238}U$. Those of skill in the art will recognize that breeder isotopes may become fissile fuels during operation. Actual fuel element physical design, chemical composition, and the selection and composition of fissile elements, breeder elements, and burnable poison elements may be varied depending on mission objectives and various tradeoffs involving weight, mission time, and radiological considerations.

In various embodiments, a moderator fluid may be provided substantially in the form of a hydrocarbon fluid that is useful in attenuating neutrons from fission reactions. In an embodiment, such a moderator fluid may be methane, or ethane, or a combination thereof. Methane is particularly advantageous since it is readily commercially available, and is an effective neutron moderator. Alternately, various isotopes of hydrogen, as discussed below, may be included as a portion, or substantially all, of the first fluid to be used as a moderator. In any event, varying fluid flow of the moderator fluid can be used to regulate, or to assist in regulation, of the fission reaction. Further, in an embodiment, control rods may be utilized, and may be advantageous depending on the degree of criticality, or approach to criticality in a sub-critical design, or as a safety feature. Additionally, a neutron source is provided via a neutron beam generator, which may also assist in regulation of the fission reaction, since the supply of neutrons to support the start of fission reaction chains is reduced by turning off the neutron beam generator. By way of engine design geometry, various embodiments may provide for intersection of a neutron beam from the neutron generator with the fissionable material in the reactor, to initiate or urge continuation of a nuclear reaction. This is because the impact of the neutrons from the neutron beam on the fissionable material results in a nuclear fission in the reactor, resulting in release of heat energy to the materials within the reactor. The reactor is sized and shaped to secure the pebble fuel elements, and to receive a low molecular weight expandable fluid such as hydrogen to cool the pebble fuel elements. The heated low molecular weight fluid is heated and then discharged out through a throat, into a rocket engine expansion nozzle for propulsive discharge therefrom.

An advantage of the novel fission based nuclear thermal propulsion rocket engine design disclosed herein is that when such an engine is utilized in a second or subsequent stage of a launch system, the radioactive fission products, i.e. expended pebble fuel elements, may be safely ejected into the vacuum of space at a selected time, place, and trajectory, rather than being discharged during firing of the rocket engine.

Advances in neutron beam generator technology are believed to make possible the development of a nuclear thermal rocket engine in which the process of production of neutrons can be partially separated from the process of absorption of neutrons by fissionable material, so that, in an embodiment, the fission process can be initiated and maintained while utilizing less than a critical mass of fissionable material. Further, a design has been developed in which radioactive fission products may be maintained in a reactor due to acceleration of the vehicle during rocket firing, so that such high molecular weight materials are not lost out of the rocket nozzle into space with other exhaust gases so as to detract from the specific impulse. For short duration rocket engine firing requirements, the fuel pebbles may be secured in place, and thus it may be unnecessary to provide a fuel replenishment system to remove spent fuel pebbles or to replenish the rocket engine with new fuel pebbles with new fissionable material to support sufficient fission in order to obtain the necessary heat release for planned mission.

BRIEF DESCRIPTION OF THE DRAWING

The present invention(s) will be described by way of exemplary embodiments, using for illustration the accompanying drawing in which like reference numerals denote like elements, and in which:

FIG. 2 is a conceptual cross-sectional view of key components for an embodiment of a rocket engine, showing a reactor with outlet configured so that high molecular weight fissile materials and reaction products therefrom are urged by acceleration of the rocket engine to remain in the reactor, and in which a restrictive throat is provided, forming an outlet which leads to conduits which convey a heated second fluid such as hydrogen to an expansion nozzle, and also showing the use of a neutron beam generator that provides a beam of neutrons into the reactor to intersect with actinides in fuel pebbles in the reactor, and also showing injection of a second, low molecular weight fluid such as hydrogen which is provided to provide cooling to fuel pebbles in which fission occurs, and thereby to expand and provide thrust when ejected through an expansion nozzle.

FIG. 4 is a partial cross-sectional view of key components of an embodiment of a rocket engine that includes a reactor with an outlet configured so that high molecular weight fissile materials are urged by acceleration of the rocket engine to remain in the reactor, and in which a restrictive throat is provided, forming an outlet which leads to conduits which take a heated second, propulsive fluid to a pair of expansion nozzles, and also showing the use of a neutron beam generator that provides a beam of neutrons into the reactor to contact with fissionable elements in the fuel pebbles, as well as conceptually depicting turbopumps for providing both a first fluid and a second fluid to the reactor, and also showing use of a gas generator for developing high pressure combustion gases for driving a moderator turbopump and a thrust fluid turbopump.

The foregoing figures, being merely exemplary, contain various elements that may be present or omitted from a final configuration for various embodiments of a gaseous nuclear thermal rocket engine using either sub-critical or critical mass fission of fuels, or that may be implemented in various embodiments described herein for a rocket engine. Other variations in gaseous nuclear thermal rocket engine designs may, use slightly different mechanical structures, mechanical arrangements, solid flow configurations, liquid flow configurations, or vapor flow configurations, and yet employ the principles described herein and as generally depicted in the drawing figures provided. An attempt has been made to draw the figures in a way that illustrates at least those elements that are significant for an understanding of exemplary nuclear thermal rocket engine designs. Such details may be quite useful for providing propulsion for a high specific impulse space vehicle, and thus, reduce cost of payloads lifted to earth orbit, lunar, or interplanetary missions.

It should be understood that various features may be utilized in accord with the teachings hereof, as may be useful in different embodiments as useful for various sizes and shapes, and thrust requirements, depending upon the mission requirements, within the scope and coverage of the teachings herein as defined by the claims.

DETAILED DESCRIPTION

As used herein, the term reactor is utilized to describe a structure in which fissile material is made to undergo a controlled nuclear reaction with the subsequent release of energy, where the thermal energy is transferred to a propulsive fluid such as hydrogen. In various embodiments, a nuclear reaction in the rocket design described may be self-sustaining (i.e. critical operation), or may depend on a neutron source as described herein for provision of sufficient neutrons to start and/or sustain the nuclear reaction (i.e. sub-critical operation). Importantly, the rocket engine designs described herein allow, in various embodiments, the optimization of fuel types between different criteria—such as reactions being (a) "source-dominated" and dependent on neutrons supplied externally by a neutron generator, or (b) "feed-back dominated" and having more than adequate neutrons from self-sustaining fission reactions, in order to attain an optimal level of sub-criticality or criticality. As an example, the fissile material in the reactor may be designed so that the reactor stays sub-critical when going from a "cold" state, before starting or after shutdown, to a "hot" state of normal operation, to allow configurations without control rods, and which would allow safe operation and safe shutdown under a variety of foreseeable emergency situations. Alternately, in the design provided, control of fissile material enables the unique control of a critical type reactor design, in that the reaction can be controlled by modulating (or terminating) injection of a moderating fluid into the reactor. Or, in a further enhancement or in other embodiments, such a gaseous nuclear engine may utilize control rods, which may be placed adjacent the pebble fuel bed, such as behind a reflector panel.

Figure 1:
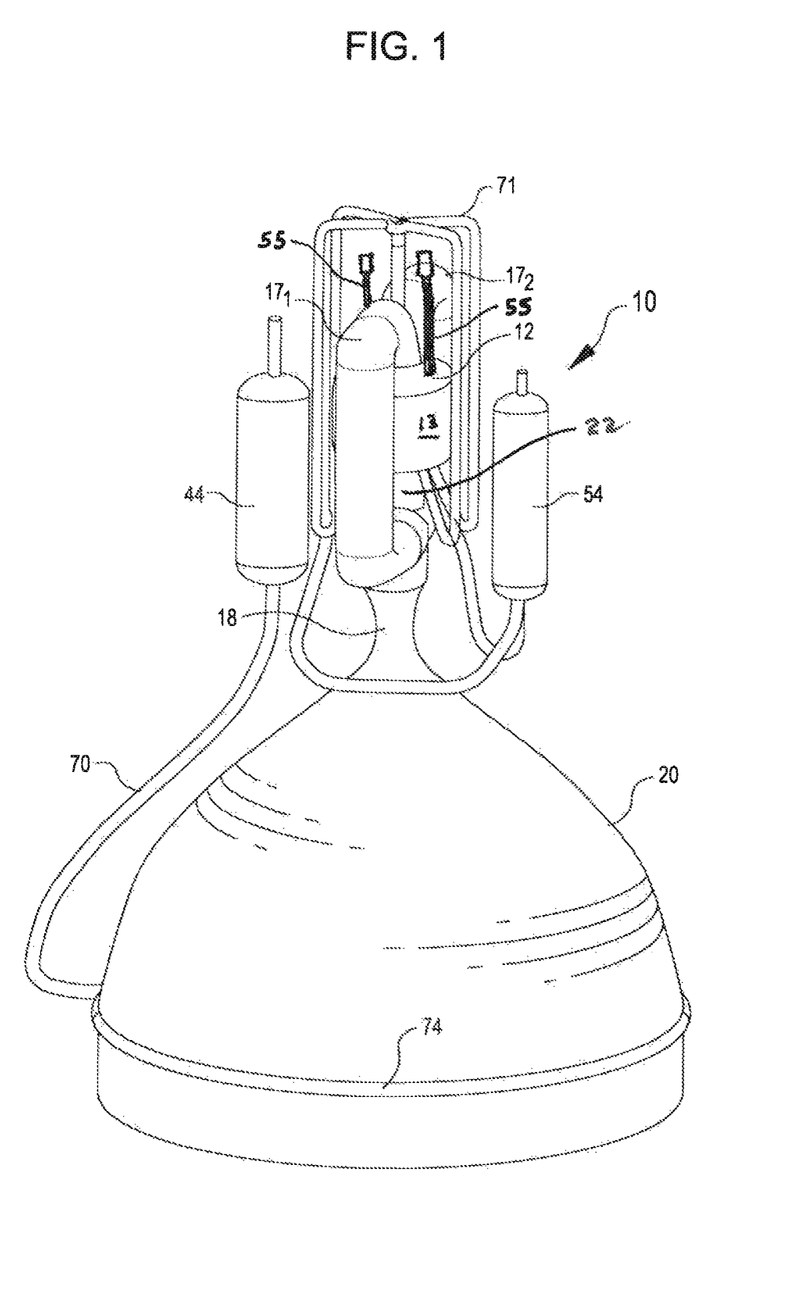
FIG. 1 is a partial perspective view for an embodiment of a rocket engine, showing the use of a reactor mounted so that the outlet for hot gases is in the same direction as the direction of travel of the rocket (rather than in the opposite direction, as would be the case if conventionally configured), in order to contain high molecular weight fissile materials during acceleration of a space vehicle on which the rocket engine is deployed, as well as showing a neutron beam generator that provides a beam of neutrons into the reactor to intersect with actinides in fuel pebbles in the reactor, and further showing the use of a pair of control rods, as well as conceptually depicting turbopumps for providing both a first fluid and a second fluid to the reactor.
Figure 2:
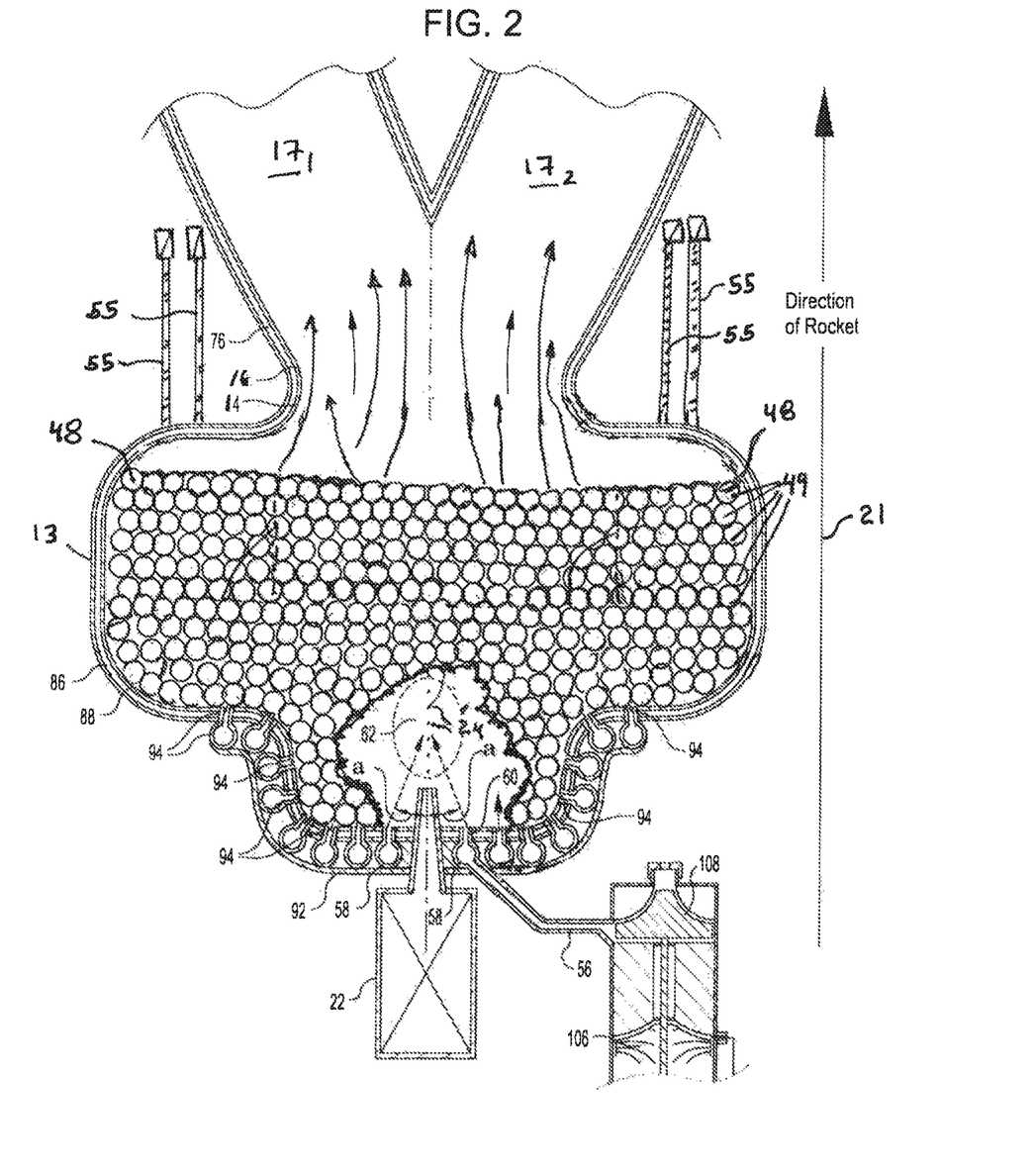
Figure 3:
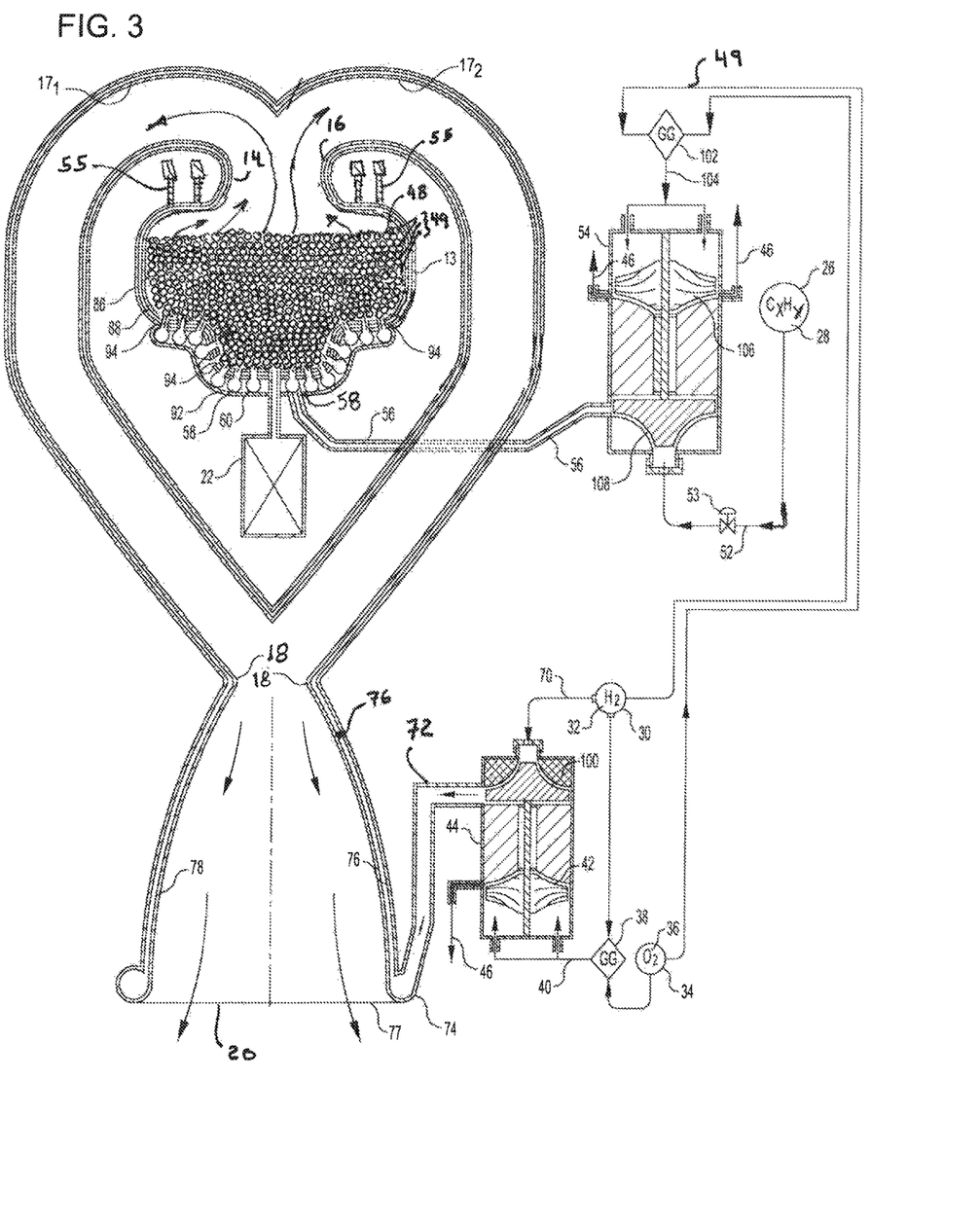
FIG. 3 is a partial cross sectional view for an embodiment of a reactor with an outlet configured so that high molecular weight fissile materials, and reaction products therefrom, are urged by acceleration of the rocket engine to remain in the reactor, and in which a restrictive throat is provided, forming an outlet which leads to conduits which take a heated second fluid such as hydrogen to an expansion nozzle, and showing the use of a neutron beam generator that provides a beam of neutrons into the reactor to intersect with actinides in the fuel pebbles in the fuel pebble bed.

Attention is directed to FIGS. 1 and 3 of the drawing. FIG. 1 shows perspective view of portions of an embodiment for a gaseous nuclear thermal rocket engine 10, showing a reactor 12 having a tubular portion 13 and a throat 14 forming an outlet 16 which leads via ducts $17_1$ and $17_2$ to the throat 18 of an expansion nozzle 20. The reactor 12 is configured with a throat 14 and outlet 16 substantially oriented toward the direction of travel of the rocket (see reference arrow 21 in FIG. 2), rather than opposite the direction of travel of the rocket, in order to minimize or prevent the loss of high molecular weight fissile materials (or byproducts produced from such fission), by physically retaining such fissile materials and byproducts in the reactor 12 due to the force of acceleration of the rocket engine 10 during firing.

A neutron beam generator 22 is provided to direct a beam of neutrons 24 in the reactor 12. A first fluid storage compartment 26 is provided for storage of a first fluid 28 which includes, or is substantially composed of, a neutron moderator. In an embodiment, the first fluid 28 may be methane ($CH_4$), or ethane ($C_2H_6$), or a mixture thereof, may be provided (generally described as having formula $C_XH_Y$ where C is carbon and H is hydrogen, and where X and Y are positive integers). One or more isotopes of hydrogen may also be included in first fluid 28, as further described below. A second fluid storage compartment 30 is provided for storage of a second fluid 32 such as hydrogen $H_2$, which may be in the form of liquid hydrogen that is commonly referred to as $LH_2$. A third fluid storage compartment 34 is provided for storage of third fluid 36, typically an oxidizer such as oxygen ($O_2$). In an embodiment, the third fluid 36 may conveniently also be used for reaction with a second fluid 32 such as hydrogen ($H_2$) in a gas generator 38 (also marked as GG in FIG. 3), to generate a high pressure fluid 40 (e.g., combustion gases) for driving a turbine 42 in a thrust turbopump 44, as mentioned below. In such case, after pressure reduction through turbine 42, remaining low pressure water vapor may be discharged overboard as indicated by reference arrow 46.

A selected actinide fuel composition which provides one or more fissile materials may be supplied in the form of fuel pebbles 48. Fuel pebbles 48 may be in the form of a fuel pebble bed 49 including a plurality of fuel pebbles 48, Fuel pebbles 48 may include fissile elements (e.g. $^{233}U$, $^{235}U$, $^{231}Th$, $^{239}Pu$), breeder elements e.g. $^{238}U$, $^{239}Th$), burnable poisons (e.g. B, Hf, etc.), and combinations of fuel elements, breeder elements, and burnable poisons. As an example, a uranium based fuel may include the fissile isotope $^{235}U$ and breeder isotope $^{238}U$. Those of skill in the art will recognize that breeder isotopes may become fissile fuels during operation, Actual fuel pebble physical design, chemical composition, and the selection and composition of fissile elements, breeder elements, and burnable poison elements may be varied depending on mission objectives and various tradeoffs involving weight, mission time, and radiological considerations. Additionally, the chemical and physical characteristics that dictate requirements due to compatibility and/or handling issues, such as chemical compatibility or radiological issues, may be involved in such design tradeoffs. In any event, the fuel pebbles 48 may, in an embodiment, comprise a plurality of selected actinide compounds. In an embodiment, the fuel pebbles 48 may include a substantially pure actinide. In an embodiment, the fuel pebbles 48 may include one or more plutonium (Pu) isotopes. In an embodiment, the fuel pebbles 48 may be supplied in as a fissile material in the form of plutonium 239 ($^{239}Pu$). In an embodiment, the fuel pebbles 48 may include fissile material in the form of uranium 235 ($^{235}U$). In various embodiments, a rocket engine 10 may operate with fission of the fissile material of fuel pebbles 48 under sub-critical mass conditions. Regardless, in various embodiments, the selected fissile material providing fuel pebbles 48 should be provided in a form (e.g. chemical structure and physical structure of each) compatible with the moderating fluid, namely first fluid 28. By way of example, and not of limitation, exemplary fuel pebbles 48 and compositions thereof are described in U.S. Pat. No. 9,793,010 B2, issued Oct. 17, 2017, to van Staden, for NUCLEAR FUEL PEBBLE AND METHOD OF MANUFACTURING THE SAME, the disclosure of which is incorporated herein in its entirety by this reference.

In an embodiment, in order to initiate a fission reaction, the neutron generator 22 is energized to provide neutrons to intersect with fuel pebbles 48 in the fuel pebble bed 49. In an embodiment, the first fluid 28 is a moderator which may be used to attenuate the neutrons resulting from fission of elements in the fuel pebbles 48 in the fuel pebble bed 49, The first fluid 28 passes through control valve 53 and then via moderator supply line 52 into a moderator turbopump 54, which pumps the first fluid 28 composition into reactor 12 via moderator supply line 56 and then via header 58. A first set of fuel injectors 60 confine and direct passage of first fluid 28 into reactor 12. In an embodiment, control valve 53 may provide on-off capability. In various embodiments, control valve 53 may additionally provide throttling capability to modulate the quantity of flow of the first fluid 28, in order to moderate the fission occurring in the pebble bed 49, through the neutron moderation capability of the first fluid 28. In an embodiment, a first set of fuel injectors 60 may be oriented at a selected inwardly directed set of angles alpha ($\alpha$) (see FIG. 2) that directs the moderator first fluid 28 toward fuel pebbles 48 in fuel pebble bed 49.

Energetic neutrons 24 from neutron beam generator 22 and those produced by fission of the fissile material in fuel pebbles 48 collide with atoms of fissile material in fuel pebbles 48, to cause fission of atoms of fissile materials, with resultant heat release. In any event, a neutron beam generator 22, which is further discussed below, is configured to direct neutrons 24 (diagrammatically depicted) to collide with moderators and then with at least some of the fissile material in at least some of the fuel pebbles 48 in the fuel pebble bed 49, to thereby effect fission of at least some of the atoms of the fissile material in fuel pebbles 48 and release heat.

In various embodiments, the first fluid 28 may be a commercially available methane, having less than zero point one (0.1) mole percent of $C_5+$ hydrocarbons thereon. In various embodiments, the first fluid 28 may further include one or more additional hydrocarbons. In an embodiment, the first fluid 28, may further include one or more isotopes of hydrogen. In an embodiment, the first fluid 28 may also include deuterium ($^2H$). In an embodiment, the first fluid 28 may include at least some tritium ($_1T^3$). In an embodiment, the first fluid 28 may additionally include both deuterium and tritium. In an embodiment, the presence of tritium may induce secondary reactions, thereby increasing specific impulse without significantly increasing engine wall temperature.

In an embodiment, further utilize control rods 55 that provide neutron attenuation. Control rods 55 may be placed adjacent the pebble fuel bed 49, such as behind a reflector panel 57 (shown in broken line).

By detailed investigation using a Monte Carlo nuclear reaction (neutron transport) modeling program, when varying mixtures of hydrogen and other fluids are utilized in combination with varying amounts of plutonium as fissionable material, it has been found that the generation of neutrons using the first fluids disclosed in prior U.S. Pat. No. 9,180,985 B1 (noted above), which were limited to hydrogen and its isotopes, resulted in high chamber pressures in order to maintain a density of hydrogen needed to provide a sufficient number of neutron collisions. Thus, the results obtained under analysis via Monte Carlo simulation described a "banks full" result, indicating excess neutron production. See TABLE 1, below. Consequently, we have now discovered that it would be advantageous to use a first fluid containing carbon, such as methane or ethane, or in an embodiment, a combination of both methane and ethane, in order to provide carbon in the reactor 12, in order to moderate the neutron emissions i.e. slow down neutrons resulting from fission) in the reactor 12. With use of such carbon containing first fluids, the reactor 12 may, in an embodiment, be operated with a reactor pressure in the range of from about three thousand pounds per square inch (3000 PSI) to about four thousand pounds per square inch (4000 PSI). In an embodiment, the turbopump 54 may operate at about six thousand (6000) pounds per square inch (PSI) discharge pressure, plus or minus about fifteen percent (15%), Such pressures are believed achievable, since, as a prior art example, the Space Shuttle Main Engine, operated by NASA in the United States, operated at a specified reactor pressure of 2994 PSIA (pounds per square inch absolute) per numbers published by Aerojet Rockedyne. See: http://Www: rocket.com/space-shuttle-main-engine.

Figure 7:
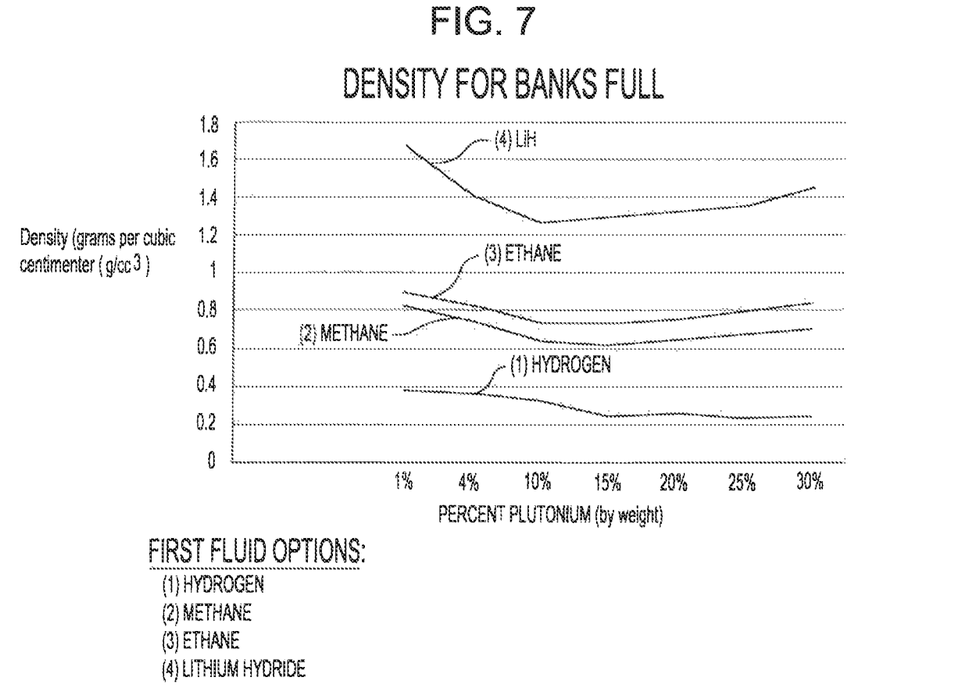
FIG. 7 graphically depicts the results obtained via use of a "Monte-Carlo" nuclear reaction (neutron transport) modeling program, when varying mixtures of hydrogen, or methane, or ethane, or lithium hydride are utilized in combination with varying amounts of plutonium as fissionable material, and graphically describes the limits reached where neutrons generated a "banks full" result, indicating density where excess neutrons are production.

The data provided by way of FIG. 7 has also been provided in tabular form by way of TABLE 1 below. As can be appreciated from TABLE 1, using methane as a first fluid, a first fluid may have a density of up to 0.67 grams per cubic centimeter, including using 25% by weight Plutonium in the fluid, before excess neutron generation is indicated by the "banks full" indication of the Monte Carlo simulation program. Similarly, if ethane is used as a first fluid, then a first fluid may have a density of up to 0.8 grams per cubic centimeter, including using 25% by weight Plutonium in the fluid, before excess neutron generation is indicated by the "banks full" indication of the Monte Carlo simulation program. On the other hand, when using 25% by weight of Plutonium, then when Hydrogen is the first fluid, the first fluid may have a density of only up to 0.23 grams per cubic centimeter, including using 25% by weight Plutonium in the fluid, before excess neutron generation is indicated by the "banks full" indication of the Monte Carlo simulation program, Consequently, the beneficial effect of including a first fluid having a carbon component as a neutron moderator is clearly evident.

To provide thrust, by way of heating and expansion in the reactor 12 and resultant expulsion out thru expansion nozzle 20, a low molecular weight propulsive fluid such as hydrogen ($H_2$) is provided as the second fluid 32. A second fluid 32 may be stored in a second fluid storage compartment 30, and on demand is delivered by line 70 to the thrust fluid turbopump 44. The thrust fluid turbopump 44 receives the second fluid 32 from the second fluid storage compartment 30 and provides (generally indirectly) the second fluid. 32 under pressure to the reactor 12. In an embodiment, the second fluid 32 may be sent under pressure from thrust fluid turbopump 44 via second fluid supply line 72 to a distribution ring 74 located at or near the exit plane 77 of expansion nozzle 20.

TABLE 1

DENSITY OF INJECTED FIRST FLUID
(in grams per cubic centimeter)
AT "BANKS FULL"
IN
MONTE CARLO SIMULATION
for
SELECTED FIRST FLUIDS

| Percent Plutonium (by weight) | Hydrogen | Methane | Ethane | LITH |
|---|---|---|---|---|
| 1% | 0.38 | 0.83 | 0.9 | 1.68 |
| 4% | 0.36 | 0.75 | 0.83 | 1.41 |
| 10% | 0.32 | 0.64 | 0.74 | 1.27 |
| 15% | 0.24 | 0.62 | 0.74 | 1.3 |
| 20% | 0.25 | 0.64 | 0.76 | 1.33 |
| 25% | 0.23 | 0.67 | 0.8 | 1.36 |
| 30% | 0.24 | 0.705 | 0.84 | 1.45 |

The second fluid 32 may be supplied via distribution ring 74 to nozzle coolant passageways 76 located on the exterior 78 of expansion nozzle 20. In this manner, an extremely cold fluid, e.g. liquid hydrogen, may be utilized as a coolant for the expansion nozzle by passage of the second fluid 32 through the nozzle coolant passageways 76. In an embodiment, at time of entry into the nozzle coolant passageways 76, the second fluid 32 may be a liquid. And, as seen in FIG. 3, the reactor 12 includes reactor coolant passageways 86 on the reactor external surface 88. In this manner, an extremely cold fluid, e.g. liquid hydrogen, is utilized as a coolant for the reactor 12 by passage of the second fluid 32 through the reactor coolant passageways 86. Thus, the rocket engine 10 may utilize the second fluid 32 as a coolant by way of the passage of second fluid 32 through the nozzle coolant passageways 76 and through the reactor coolant; passageways 86, before injection of the second fluid 32 into the reactor 12. Various concepts for the detailed construction of rocket engine nozzles including the use of cooling channels, film cooling interior to the nozzle, or injection of fluids through reactor or nozzle walls, are known in the art. Thus, the illustrations provided herein should be considered conceptual and not restrictive. For background, the reader is referred to (1) NASA Report NASA SP-0B087, April 1972, entitled Liquid Rocket Engine Fluid-Cooled Combustion Chambers, (2) U.S. Pat. No. 6,789,316 B2, issued Sep. 14, 2004 to Haggander et al. for a Method for Manufacturing Outlet Nozzles for Rocket Engines, (3) U.S. Pat. No. 7,389, 636 B2, issued Jun. 24, 2008 to Fowler et al, for a Booster Rocket Engine Using Gaseous Hydrocarbon in Catalytically Enhanced Gas Generator Cycle, and (4) U.S. Pat. No. 5,067,316 issued Nov. 26, 1991 to Bonniot for a Rocket Engine Expansion Nozzle With Complementary Annular Nozzle, the disclosures of each of which are incorporated herein by this reference.

Once second fluid 32 reaches the reactor 12, a collection header 92 may be utilized to accumulate the second fluid 32 from the reactor coolant passageways 86. In an embodiment, from collection header 92, the second fluid 32 may be directed to a second set of injectors 94 which are configured for confining the passage of the second fluid 32 during injection into the reactor 12. By way of injectors 94, the second fluid 32 may be directed toward or injected into pebble fuel bed 49, or into a mixing zone 62. In the pebble fuel bed 49, the second fluid 32 is heated and is then discharged through throat 14 and outlet 16 of reactor 12, and passes through outlet ducts (e.g. ducts 17$_1$ and 17$_2$) and thence providing thrust by ejection through throat 18 of expansion nozzle 20.

Figure 4:
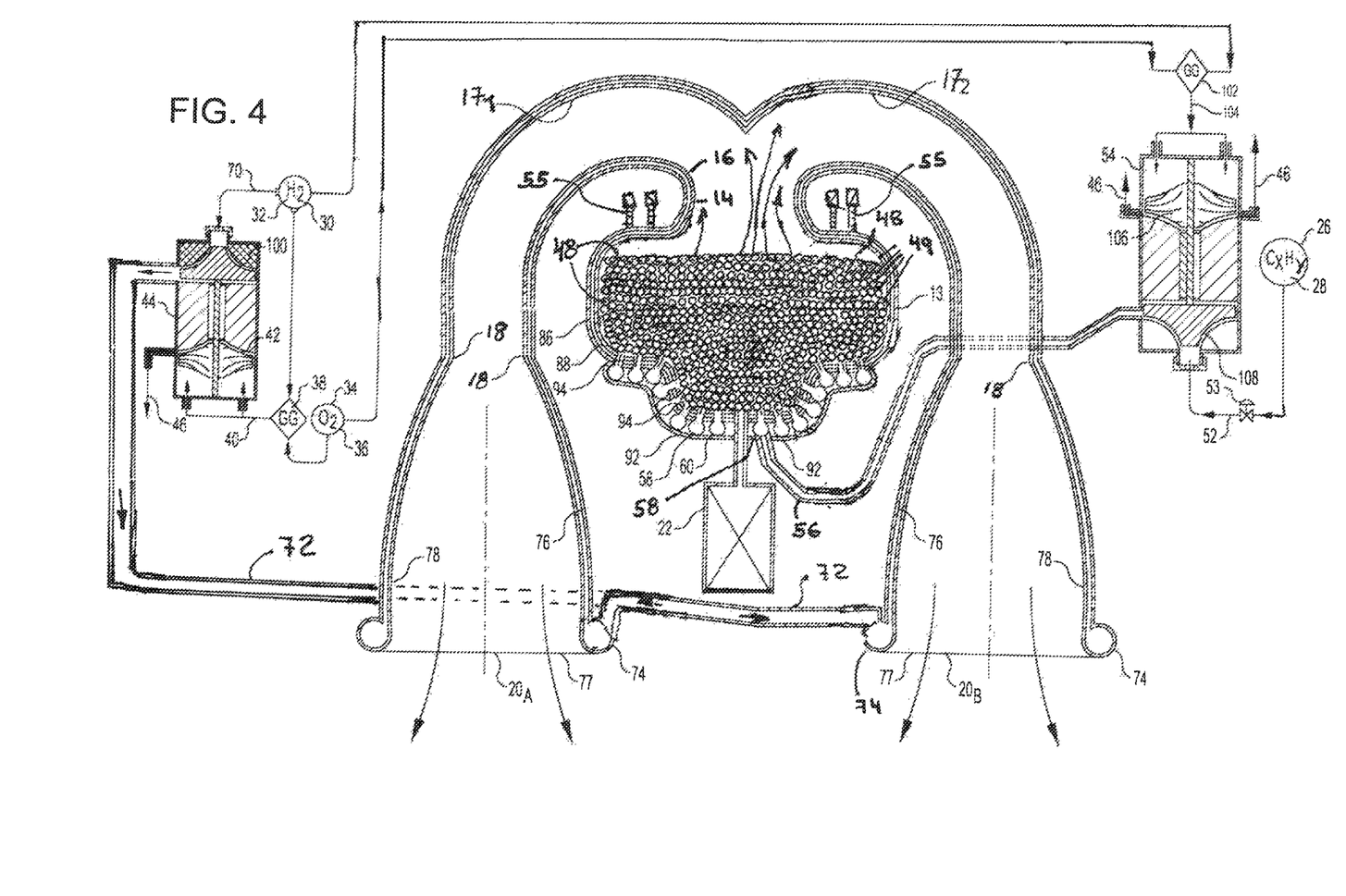
Figure 5:
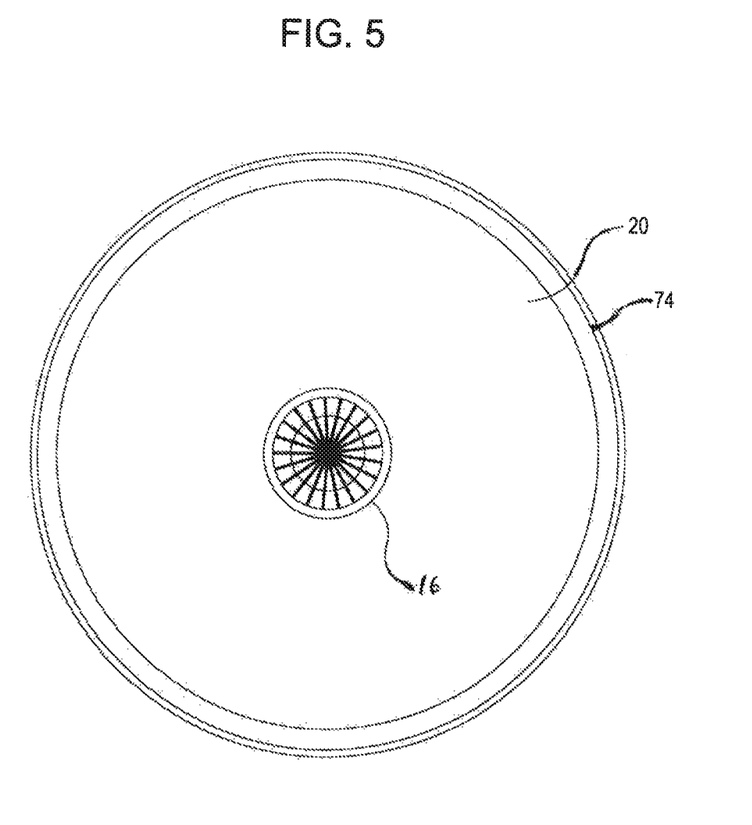
FIG. 5 is a bottom view of a an embodiment for a rocket engine, taken looking up into an expansion nozzle, showing the second fluid distributor at the outlet of the expansion nozzle that is used to distribute the second fluid to coolant passageways along the walls of the expansion nozzle and the reactor, and also showing the outlet of the reactor.

As mentioned above and illustrated in FIG. 4, in order to provide power for the thrust fluid turbopump 44, a gas generating chamber 38 may be provided to generate combustion products in the form of a high pressure hot gas 40 that drives a turbine 42, which in turn drives a pump impeller 100. Consequently, when oxygen, the third fluid 36 is supplied for combustion with hydrogen as second fluid 32, water vapor is formed, and the resultant low pressure water vapor stream 46 is discharged overboard. Likewise, as also illustrated in FIG. 4, hydrogen as second fluid 32 and oxygen 36 may be supplied to a second gas generating unit 102 to generate hot gas 104 that drives turbine 106 which in turn drives pump impeller 108 in turbopump 54, which is used to supply a moderating first fluid 28 to the fuel pebble bed 49.

Figure 6:
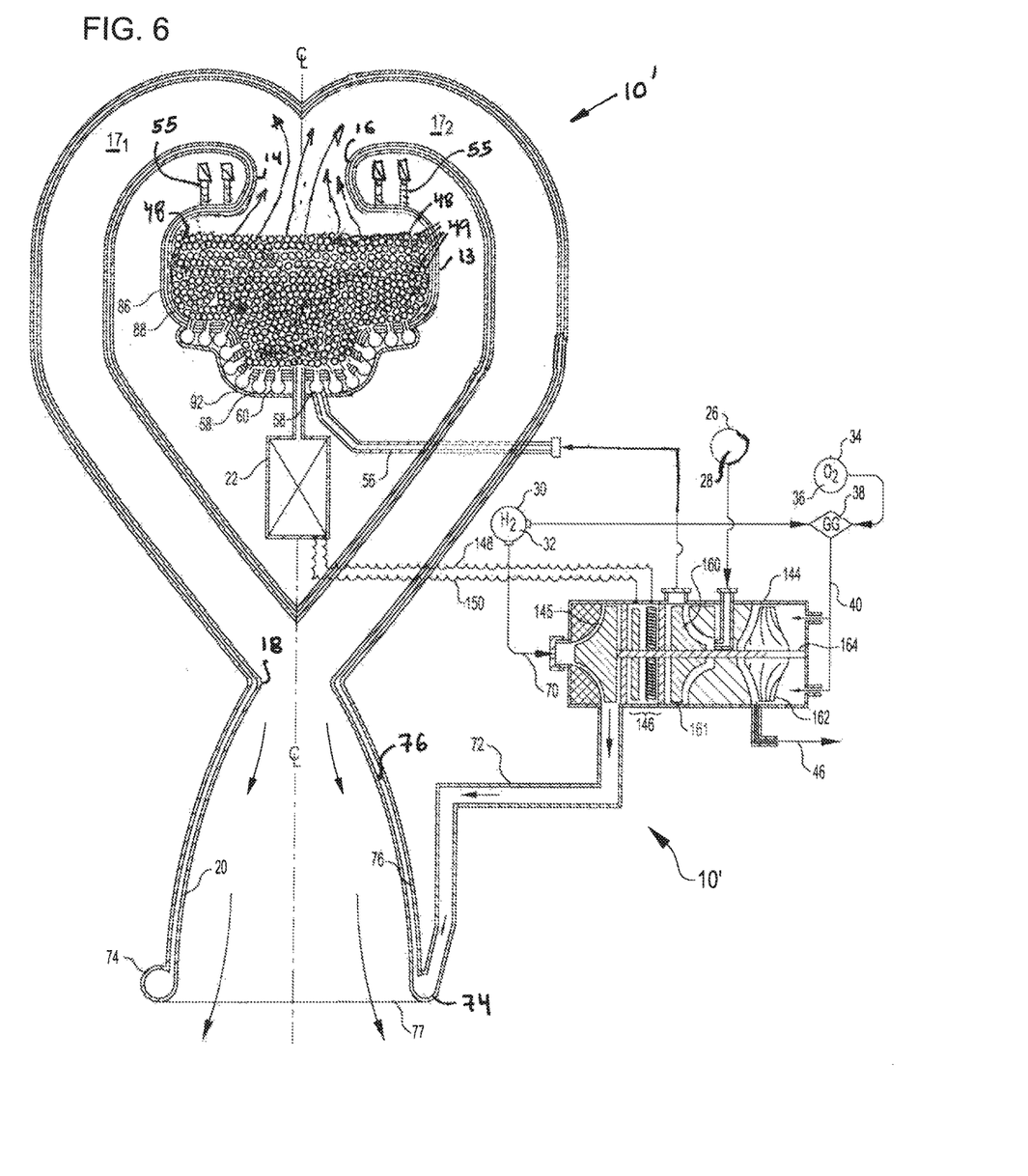
FIG. 6 is a partial cross sectional view for an embodiment of an rocket engine, depicting a reactor with an outlet which leads to an expansion nozzle, and a neutron beam generator that provides a beam of neutrons into the reactor to intersect with fuel elements in the reactor, and also showing injection of a second fluid which is provided to provide thrust for expansion due to heating of the second fluid in the reactor, as well as diagrammatically depicting use of turbopumps on a common shaft or gear box for providing both a first fluid and a second fluid to the reactor, and also having, driven by the same turbine system, an electrical generator for generating electrical power for supply to the neutron beam generator.

In another embodiment for rocket engine 10' as seen in FIG. 6, a different design for a turbopump 144 may be provided. In such design, the turbopump 144 may provide pumping of second fluid 32 (a propulsive fluid, e.g. hydrogen) by pump impeller 145, while also additionally powering an electrical generator 146. In an embodiment, the electrical generator 146 may be configured to generate electrical power and supply the same via electrical power lines 148 and 150 to neutron beam generator 22. In an embodiment, an embodiment for a turbopump 144 may further include a turbopump 160, for receiving first fluid 28 (a moderator fluid, e.g. methane) from the first fluid storage compartment 26 and providing the first fluid 28 under pressure to reactor 12. In an embodiment, the turbopump rotor 145, the turbopump rotor 161, and the electrical generator 146 may all be driven by a gas turbine 162 on a common shaft 164 or via gearbox from a common shaft 164.

In various embodiments for a rocket engine 10 or 10' or the like, using nuclear thermal heating of a low molecular weight gas such as hydrogen as described herein, a rocket engine may be provided that has a specific impulse in the range of from about eight hundred (800) seconds to about twenty five hundred (2500) seconds. In various embodiments using nuclear thermal heating of a low molecular weight gas such as hydrogen as described herein, a rocket engine may be provided that has a specific impulse in the range of from about one thousand (1000) seconds to about twelve hundred fifteen (1215) seconds.

To summarize, in order to facilitate supply of a propulsive constituent, which may consist essentially of hydrogen, to the reactor 12 for heating, a turbopump 44 or 144 or the like may be provided as generally described herein above. In an embodiment, liquid hydrogen, i.e. a cryogenic liquid, may be provided to the rocket engine 10 or 10', by way of a turbopump that is driven by a turbine which is rotatably energized by high pressure gases. In an embodiment, the high pressure gases may be provided by way of combustion products, such as by way of combustion of hydrogen and oxygen in a gas generating chamber GG to generate a high pressure combustion gas, which after passage through the turbine 42 or 162, as the case may be, may be exhausted overboard in the form of a water vapor stream 46 or 46'. The tradeoff of loss of efficiency due to loss of propellant (hydrogen) expended in the gas generating chamber GG, in view of the usual weight savings and simplicity of design (and lack of radioactive contamination), as compared to additional weight and complexity in view of any additional specific impulse contribution in designs that might avoid such combustion losses, may be evaluated for a specific space vehicle design and attendant mission profile, as will be understood by those of skill in the art. Various configurations for drive of a suitable turbopump for feeding hydrogen to the reactor may be provided by those of skill in the art using conventional liquid turbopump system design principles, and thus, it is unnecessary to provide such details. In general, a turbopump must avoid cavitation while pumping liquid hydrogen at relatively low inlet pressure, and deliver the hydrogen to the reactor (and in an embodiment, via distribution ring and cooling passageways) at very high pressures, and preferably, with capability to provide a relatively wide throttling range. In various embodiments, the selected turbopump 44 or 144 design may be optimized for minimizing weight while providing necessary performance while at the same time minimizing the turbopump package size, in order to minimize necessary space in a selected space vehicle design. Selection of suitable bearings and seals are of course necessary, and various design alternatives are known to those of skill in the art. More generally, those of skill in the art will understand that turbopumps for supply of cryogenic liquids to rocket engines require designs that provide maximum performance at minimum weight.

Similarly, to facilitate supply of the first fluid carrying a moderating first fluid 28 to the reactor 12 for assist in control of fission, a turbopump 54 may be provided. In various embodiments, liquid methane, or liquid ethane, or combinations thereof (i.e. cryogenic liquids), may be provided to the rocket engine 10 or 10', by way of a turbopump 54 or 160, that is driven by a turbine (106 or 162) which is rotatably energized by high pressure gases. In an embodiment, the high pressure gases may be provided by way of combustion products, such as by way of combustion of hydrogen and oxygen to generate a high pressure combustion gas. Various configurations for drive of a suitable fuel turbopump for feeding reactants to the reactor may be provided by those of skill in the art using conventional liquid turbopump system design principles, and thus, it is unnecessary to provide such details. In general, a turbopump (54 or 160) must avoid cavitation while pumping liquids at relatively low inlet pressure, and deliver the liquids to the reactor at very high pressure, and preferably, with capability to provide a relatively wide throttling range. In various embodiments, the selected fuel turbopump design may be optimized for minimizing weight while providing necessary performance while at the same time minimizing turbopump package size, in order to minimize necessary space in a selected space vehicle design.

Further, in order to generate electricity for a selected neutron beam generator 22, an electrical generator 146 may be combined with a turbopump 144, so that a hot gas driven turbine 162 in the turbopump 144 also provides shaft power for an electrical generator 146. In an embodiment, the high pressure gases may be provided by way of combustion products, such as by way of combustion of hydrogen and oxygen in a gas generating chamber GG to generate a high pressure combustion gas, which after passage through the gas turbine 162, may be exhausted overboard as a water vapor exhaust stream 46, Alternately, a stand-alone electrical turbine generator may be provided, with its own hydrogen gas or combustion gas driven turbine, in the manner as generally described above.

In an embodiment, a deuterium-deuterium. ("DD") type neutron generator 22 may be utilized. As an example, high yield neutron generators are currently available for various applications with variable neutron output between $1\times10^{11}$ and $5\times10^{11}$ neutrons per second (n/s). It is an advantage of a DD type neutron generator design that because no tritium is utilized, radiation shielding and accompanying safety concerns and regulatory burdens are significantly reduced. Thus, such designs may be suitable for manned space vehicles. In an embodiment, a deuterium-deuterium (DD)

neutron generator design may provide a 2.5 MeV neutron generator, with basic functionality as follows:

$$_1D^2 + {_1}D^2 \rightarrow He^3 + {_0}n^1 \text{ (2.5 MeV)}$$

Such functionality allows a moderator, such as methane or hydrogen, or other hydrocarbon as described above, to reduce the energy of the neutron to an energy level where it is more likely to be absorbed by the nucleus of an actinide like plutonium, e.g. to an energy level in the range of about 0.5 MeV.

In an embodiment, a deuterium-tritium ("DT") type neutron generator may be utilized. As an example, extremely high yield neutron generators based on. DT design principles are currently available with variable neutron output between $1\times10^{13}$ and $5\times10^{13}$ neutrons per second (n/s). Such designs may require appropriate shielding and regulatory approvals for manned spaceflight applications, but may be especially suitable for high payload unmanned spaceflight vehicle applications.

Neutron generators of either deuterium-deuterium design or of deuterium-tritium design have been developed by Phoenix Nuclear Labs, 2555 Industrial Drive, Monona, Wis. 53713, with a web page at http://phoenixnuclearlabs.com. Other vendors currently provide different designs. For example, Gradel Group, 6, Z.A.E. Triangle Vert, L-5691 ELLANGE Luxembourg (see http://gradel.lu/en/activities/neutrons-generators/products/14-1-mev-neutraons-dt/) currently provides a 14 MeV neutron generator of deuterium-tritium design, with basic functionality as follows:

$$_1D^2 + {_1}T^3 \rightarrow {_2}He^4 \text{ (3.5 MeV)} + {_0}n^1 \text{ (14.1 eV)}$$

It is currently anticipated that any selected neutron beam generator design may require adaptive configurations to various structures and components to make them suitable for the rigors of a rocket launch and subsequent spaceflight environment. However, the fundamental principles described herein for creation of a fission based rocket engine may be achieved by provision of a suitably adapted neutron beam generator device. For further background as to design of neutron beam generators and selection of suitable fissile materials for sub-critical reactor operation, reference is made to *Accelerator-driven Systems (ADS) and Fast Reactors (FR) in Advanced Nuclear Fuel Cycles*, by the Nuclear Energy Agency Organization for Economic-Cooperation and Development, copyright 2002, at chapter 4, and found at https://www.oecd-nea.org/ndd/reports/2002/nea3109-ads.pdf, which describes examples of spallation targets used in neutron generation, as well as examples of criteria for actinide selection in optimization of reactor design, the disclosure of which is incorporated herein by this reference.

Overall, it will be appreciated that in the design of a gaseous nuclear thermal rocket engine, efficiency is maximized by using the highest temperature available, given materials design constraints, and by utilizing a propulsive fluid that has a. very low molecular mass for generation of thrust. For that reason, use of hydrogen as a propulsive fluid, as heated using a nuclear thermal rocket engine, would be advantageous. For example, a nuclear thermal rocket engine may operate at a temperature of up to 2000° C.

In an embodiment for a method of operating a nuclear thermal rocket engine, a reactor is provided having a fuel inlet, a propellant inlet, and an outlet directed substantially toward the direction of travel of the nuclear thermal rocket engine, Fissile material is secured in the reactor in the form of fuel pebbles 48 in a pebble bed 49. A neutron beam generator is provided, which generates neutrons and directs them into the reactor, to bombard nuclei of fissile material with neutrons. When the neutrons encounter the fissile materials, additional neutrons are generated, and thus the multiplying neutrons provide a steadily growing sub-critical nuclear reaction of fissile material in a fission process to generate thermal energy. The propulsive low molecular weight fluid is supplied to the reactor via the propellant inlet. Thermal energy evolved, from a sub-critical (or a critical) fission process is recovered by heating the propulsive low molecular weight fluid. The propulsive low molecular weight fluid is directed through an expansion nozzle, to provide thrust, at a specific impulse in the range of from about eight hundred (800) seconds to about twelve hundred fifteen (1215) seconds. To retain fissile material in the reactor, the reactor is subjected to acceleration of between about 0.5 g and 9 g, wherein 1 g is about 9.8 meters per second per second, whereby the high molecular weight fissile material and decomposition products of the fissile material are substantially retained in the reactor when the acceleration force is imparted on the reactor In the foregoing description, for purposes of explanation, numerous details have been set forth in order to provide a thorough understanding of the disclosed exemplary embodiments for the design of a nuclear thermal rocket engine operable in sub-critical mass fissile conditions. However, certain of the described details may not be required in order to provide useful embodiments, or to practice selected or other disclosed embodiments. Further, for descriptive purposes, various relative terms may be used. Terms that are relative only to a point of reference are not meant to be interpreted as absolute limitations, but are instead included in the foregoing description to facilitate understanding of the various aspects of the disclosed embodiments. And, various actions or activities in any method described herein may have been described as multiple discrete activities, in turn, in a manner that is most helpful in understanding the present invention. However, the order of description should not be construed as to imply that such activities are necessarily order dependent. In particular, certain operations may not necessarily need to be performed precisely in the order of presentation. And, in different embodiments of the invention, one or more activities may be performed simultaneously, or eliminated in part or in whole while other activities may be added. Also, the reader will note that the phrase "in an embodiment" or "in one embodiment" has been used repeatedly. This phrase generally does not refer to the same embodiment; however, it may. Finally, the terms "comprising", "having" and "including" should be considered synonymous, unless the context dictates otherwise.

It will be understood by persons skilled in the art that various embodiments for novel nuclear thermal rocket engine designs utilizing sub-critical mass fission, or critical mass fission, of a selected actinide fissile material have been described herein only to an extent appropriate for such skilled persons to make and use such a gaseous nuclear thermal rocket engine, Additional details may be worked out by those of skill in the art for a selected set of mission requirements and design criteria, such as whether the mission is manned or unmanned, (e.g., whether any necessary radiation minimization or radiation shielding may be required). Although only certain specific embodiments of the present invention have been shown and described, there is no intent to limit this invention by these embodiments. Rather, the invention is to be defined by the appended claims and their equivalents when taken in combination with the description.

Importantly, the aspects and embodiments described and claimed herein may be modified from those shown without materially departing from the novel teachings and advantages provided, and may be embodied in other specific forms without departing from the spirit or essential characteristics thereof. Therefore, the embodiments presented herein are to be considered in all respects as illustrative and not restrictive or limiting. As such, this disclosure is intended to cover the structures described herein and not only structural equivalents thereof, but also equivalent structures.

Numerous modifications and variations are possible in light of the above teachings. Therefore, the protection afforded to this invention should be limited only by the claims set forth herein, and the legal equivalents thereof.

We claim:

1. A gaseous nuclear engine for a rocket, comprising: a neutron beam generator for generating neutrons; a first fluid storage compartment for storage of a first fluid, said first fluid comprising a neutron moderating hydrocarbon of the general formula $C_XH_Y$, where X and Y are positive integers, and wherein C is carbon, and H is hydrogen;
   a second fluid storage compartment for storage of a second fluid said second fluid comprising hydrogen;
   a reactor, said reactor comprising
   (a) a chamber for containing said first fluid and said second fluid during heating;
   (b) a first set of injectors for confining passage into said reactor of said first fluid received from said first fluid storage compartment;
   (c) a second set of injectors for directing passage into said reactor of said second fluid received from said second fluid storage compartment;
   (d) said reactor further comprising a heating zone, the reactor supporting a plurality of fuel pebbles comprising fissile material, and wherein said second fluid, is injected into said reactor for passage through said heating zone; and
   (e) a reactor outlet and an expansion nozzle facing opposite the direction of the reactor outlet such said fuel pebbles are urged to remain in said reactor as a result of thrust from said expansion nozzle accelerating said reactor, said expansion nozzle fluidly connected to said reactor outlet;
   wherein said neutron beam generator is configured to direct neutrons to collide with said neutron moderating hydrocarbon and thence with at least some of said fissile material in said heating zone, whereby said neutrons and the fissile material interact to thereby effect fission of at least some of the fissile material and release heat; and
   wherein said first fluid and said second fluid are contained by and heated in said reaction chamber to produce a heated gas which is released through said reactor outlet and then expelled through said expansion nozzle to create said thrust.

2. The gaseous nuclear engine as set forth in claim 1, wherein said first fluid comprises methane ($CH_4$), or ethane ($C_2H_6$), or a mixture thereof.

3. The gaseous nuclear engine as set forth in claim 2, wherein said first fluid further comprises deuterium ($_1D^2$) or tritium ($_1T^3$).

4. The gaseous nuclear engine as set forth in claim 2, wherein said first fluid further comprises one or more additional hydrocarbons.

5. The gaseous nuclear engine as set forth in claim 4, wherein said first fluid comprises less than zero point one (0.1) mole percent of $C_5+$ hydrocarbons.

6. The gaseous nuclear engine as set forth in claim 1, wherein said fissile elements comprise one or more of $^{233}U$, $^{235}U$, $^{231}Th$, and $^{239}Pu$.

7. The gaseous nuclear engine as set forth in claim 6, wherein said fuel pebbles further comprise burnable poisons, said burnable poisons comprising one or more of B and Hf.

8. The gaseous nuclear engine as set forth in claim 6, wherein said fuel pebbles further comprise breeder elements, said breeder elements comprising one or more of $^{238}U$ and $^{232}Th$.

9. The gaseous nuclear engine as set forth in claim 1, wherein said expansion nozzle comprises nozzle coolant passageways.

10. The gaseous nuclear engine as set forth in claim 9, wherein said second fluid is utilized as a coolant by passage through said nozzle coolant passageways, before injection of said second fluid into said reactor.

11. The gaseous nuclear engine as set forth in claim 10, wherein said second fluid, at time of entry into said nozzle coolant passageways, comprises a liquid.

12. The gaseous nuclear engine as set forth in claim 10, wherein said reactor further comprises reactor coolant passageways.

13. The gaseous nuclear engine as set forth in claim 11, wherein said second fluid is utilized as a coolant by passage through said reactor coolant passageways, before injection of said second fluid into said reactor.

14. The gaseous nuclear engine as set forth in claim 1, wherein said gaseous nuclear engine has a specific impulse in a range of from eight hundred (800) seconds to twenty five hundred (2500) seconds.

15. The gaseous nuclear engine as set forth in claim 1, wherein said rocket engine has a specific impulse in a range of from one thousand (1000) seconds to twelve hundred fifteen (1215) seconds.

16. The gaseous nuclear engine as set forth in claim 1, further comprising a moderator turbopump, said moderator turbopump configured to receive said first fluid from said first fluid storage compartment, and provide said first fluid under pressure to said reactor.

17. The gaseous nuclear engine as set forth in claim 1, further comprising a propulsive fluid turbopump, said propulsive fluid turbopump configured to receive said second fluid from said second fluid storage compartment, and to provide said second fluid under pressure to said reactor.

18. The gaseous nuclear engine as set forth in claim 17, wherein said propulsive fluid turbopump operates in a range of from 3000 pounds per square inch absolute (PSIA) to 10.000 pounds per square inch absolute (PSIA) discharge pressure.

19. The gaseous nuclear engine as set forth in claim 18, wherein said gaseous nuclear engine is configured to operate at a reactor temperature of 2000° C.

20. A method of producing thrust in a nuclear thermal rocket engine, comprising:
   providing a reactor, said reactor having a fuel inlet, a propellant inlet, and an outlet directed toward the direction of travel of the nuclear thermal rocket engine, and an expansion nozzle facing opposite the direction of the outlet such that fissile material is urged to remain in said reactor as a result of thrust from said expansion nozzle accelerating said reactor, said expansion nozzle fluidly connected to said reactor outlet;
   providing fissile material to said reactor, said fissile material provided in a plurality of fuel pebbles, said fuel pebbles located in a bed;

providing a first fluid to said reactor, said first fluid comprising a neutron moderating hydrocarbon of the general formula CxHy, where X and Y are positive integers, and wherein C is carbon, and H is hydrogen;

providing a neutron beam generator, said neutron beam generator generating neutrons and directing them to said neutron moderating hydrocarbon in said reactor to reduce the energy level of said neutrons from the range of 2.5 MeV or higher to 0.5 MeV or below, to provide moderated neutrons which bombard nuclei of fissile material;

generating and multiplying neutrons from said fissile material, and thus providing a steadily growing nuclear reaction of said fissile material in a fission process to generate thermal energy;

providing a propulsive fluid to said reactor via said propellant inlet;

recovering thermal energy evolved from fission process by heating said propulsive fluid to generate a heated fluid therefrom;

expanding said heated fluid through said expansion nozzle, to provide a specific impulse in the range of from eight hundred (800) seconds to twelve hundred fifteen (1215) seconds, to create said thrust;

wherein said fissile material in said reactor is subjected to an acceleration force of between about 0.5 and 9 gs, wherein 1 g has the same value as the force of gravity at the Earth's surface of about 9.8 meters per second per second.

\* \* \* \* \*